Dec. 23, 1924.

H. C. RAVER

AUTOMOBILE HEADLIGHT MECHANISM

Filed Sept. 25, 1923

1,520,551

Inventor
Harvey C. Raver
By E. H. Bond
Attorney

Patented Dec. 23, 1924.

1,520,551

UNITED STATES PATENT OFFICE.

HARVEY C. RAVER, OF SALEM, ILLINOIS.

AUTOMOBILE HEADLIGHT MECHANISM.

Application filed September 25, 1923. Serial No. 664,657.

*To all whom it may concern:*

Be it known that I, HARVEY C. RAVER, a citizen of the United States, residing at Salem, in the county of Marion and State of Illinois, have invented certain new and useful Improvements in Automobile Headlight Mechanism, of which the following is a specification.

This invention relates to certain new and useful improvements in automobile headlight mechanism, and it has for its objects among others to provide a simple, yet efficient mechanism that can be readily applied to motor vehicles now in use without material cost, and by which the driver, when meeting cars can readily throw the lights downward, so that the full force of the bright lights will not be lessened but will be thrown downward directly in front of the car, at any desired angle, so as to give a full illumination of the road and approaching car, and yet doing away with all glare on approaching cars, thus obviating an evil that is at the present time so dangerous.

The mechanism is simple in the extreme, yet most reliable and efficient in use, and yet permitting of the lights being thrown upward into normal position as soon as the approaching car has passed.

Other objects and advantages of the invention will hereinafter appear, and the novel features thereof will be specifically pointed out in the appended claims.

The invention, in its preferred form, is clearly illustrated in the accompanying drawings, which, with the numerals of reference marked thereon, form a part of this specification and in which—

Like numerals of reference indicate like parts throughout the several views.

Referring to the drawings—

I have shown only sufficient parts of an automobile or the like as are necessary for the proper understanding of the application and operation of my present invention.

1 designates the radiator, 2 the wheel fenders and 3 a portion of the body of the vehicle.

4 is a front cross bar carrying the lamps 5, 5 of usual or any approved construction, 6 being the uprights from said rod to which the lamps may be affixed in any suitable manner.

Figure 2:
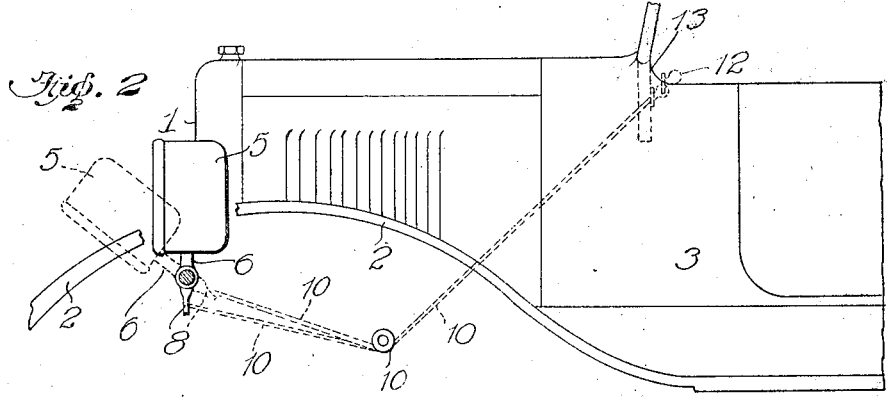
Figure 2 is a side elevation with a portion of the wheel fender broken away.
Figure 3:
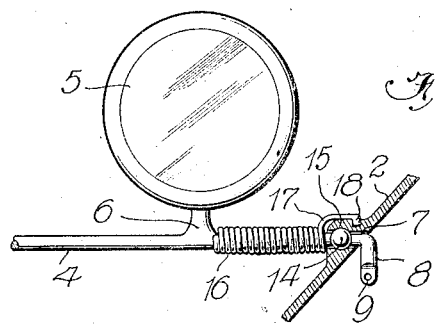
Figure 3 is an enlarged detail partly in section showing the connection of the spring and the ball bearing for the rod carrying the lamps.

The rod 4 has its ends extended through openings 7 in the fenders, see Figure 3, the ends being turned at an angle, forming the angled extensions 8, there being one at each, or at one end only, as may be found most expedient. This angled end or member 8 has an opening 9 therein for the attachment of a cord or cable 10, of which there may be one, attached to one end, or two, one attached to each end of the said rod, the cord or cable 10, or cords or cables, extending beneath a roller 11 suitably mounted beneath the bottom of the car, the said cord or cords then being extended to a point within reach of the driver of the vehicle as seen in Figure 2 and attached to a controlling member 12 suitably arranged within the car and supported from the dash 13 of the car, see Figure 2.

The rod 4 has its ends mounted on ball bearings as seen in Figure 3, which may be of any suitable character, but preferably as shown, the end of the rod extended loosely through the opening 7 and provided adjacent the bend with a ball member 14 which is received in the enlarged opening 15 in the fender, all as seen in Figure 3. This makes a cheap, yet efficient form of ball bearing for the rod.

16 is a spring, one shown at each end of the rod 4. This spring has one end bent as at 17 and provided with the angular terminal 18 which is engaged in an opening in the fender as seen in Figure 3, the other end of the spring being secured to or having a bearing against the rod 4, the spring being coiled around the said rod as shown and tending all times, unless otherwise tensioned, to keep the rod in such position as to hold the lights in upright position.

Figure 1:
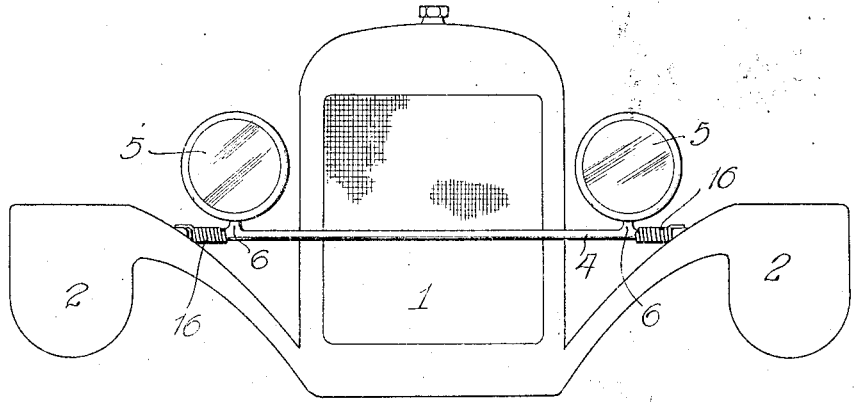
Figure 1 is a front view of a motor vehicle equipped with my present improvement.

The operation will be readily understood from the foregoing description when taken in connection with the annexed drawing, but, briefly stated, is as follows. Under normal conditions the lamps are in their upright position, that seen in Figures 1, 2 and 3 in full lines. In this position the lights are thrown straight ahead, but when it is desired to throw the lights downward to any degree the control member 12 is actuated so as to throw the lamps downward into the inclined position shown by dotted lines in Figure 2, more or less as may be desired, holding them there till the approaching car has passed, when, by releasing the control member the lamps are brought into their upright or normal position by the action of the springs.

Any suitable means may be provided for holding the control member so that the lights may be held in their downward position for an indefinite period, if desired.

Modifications in detail may be resorted to without departing from the spirit of the invention or sacrificing any of its advantages.

What is claimed as new is:—

1. Headlight mechanism embodying a rod to which the lamps are rigidly affixed and normally tensioned to hold the lamps in upright position, said rod being formed with a ball member near each end and having an angled end, and means connected with said end to turn the rod against the force of the said tensioning means.

2. In headlight mechanism, a rod to which the lamps are rigidly affixed and formed with ball members mounted to turn in bearings in the fenders of the car, a spring acting on one end of the rod to tension the lamps normally into their upright position, and means acting on the rod to turn it against the tension of the spring to throw the lights from an upright position to a downwardly inclined position.

3. In a headlight mechanism, a rod mounted for partial rotation, springs attached to the rod near its ends and normally tending to prevent rotation of the rod, the rod being formed near its ends with ball members and having an angled terminal for attachment of its operating means, and lamps rigid with said rod near its ends.

In testimony whereof I affix my signature.

HARVEY C. RAVER.